(12) United States Patent
Fujii et al.

(10) Patent No.: US 11,781,480 B2
(45) Date of Patent: Oct. 10, 2023

(54) OIL SUPPLY DEVICE OF AIRCRAFT GAS TURBINE

(71) Applicant: KAWASAKI JUKOGYO KABUSHIKI KAISHA, Kobe (JP)

(72) Inventors: Takafumi Fujii, Kobe (JP); Tatsuya Okuwa, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 404 days.

(21) Appl. No.: 17/273,138

(22) PCT Filed: Sep. 3, 2019

(86) PCT No.: PCT/JP2019/034522
§ 371 (c)(1),
(2) Date: Mar. 3, 2021

(87) PCT Pub. No.: WO2020/050238
PCT Pub. Date: Mar. 12, 2020

(65) Prior Publication Data
US 2021/0324798 A1 Oct. 21, 2021

(30) Foreign Application Priority Data
Sep. 5, 2018 (JP) ................. 2018-166107

(51) Int. Cl.
*F02C 7/06* (2006.01)
*F01D 25/20* (2006.01)

(52) U.S. Cl.
CPC .............. *F02C 7/06* (2013.01); *F01D 25/20* (2013.01); *F05D 2220/323* (2013.01); *F05D 2260/98* (2013.01)

(58) Field of Classification Search
CPC .. F02C 7/06; F02C 7/185; F01D 25/20; F05D 2220/323; F05D 2260/98
See application file for complete search history.

(56) References Cited

U.S. PATENT DOCUMENTS 4,284,174 A * 8/1981 Salvana ................. F16C 19/52
60/39.08
5,911,678 A * 6/1999 White ..................... F01D 25/18
60/39.08

(Continued)

FOREIGN PATENT DOCUMENTS

JP 2001165390 A * 6/2001
JP 2013-083159 A 5/2013
JP 2014163236 A * 9/2014

*Primary Examiner* — Michael A Riegelman
(74) *Attorney, Agent, or Firm* — Sughrue Mion, PLLC (57) ABSTRACT

An oil supply device of an aircraft gas turbine includes: a lubrication extraction pipe including a first end and a second end, the first end communicating with a compressor of the gas turbine, an ejection port being provided at the second end and directed to a lubricated member; an oil tank configured to store oil; an oil pipe including a first end and a second end, the first end communicating with the oil tank, the second end communicating with the lubrication extraction pipe; and an electric pump interposed on a portion of the oil pipe and configured to suck the oil from the oil tank and supply the oil to an inside of the lubrication extraction pipe.

7 Claims, 5 Drawing Sheets

(56) References Cited

U.S. PATENT DOCUMENTS

| | | | |
|---|---|---|---|
| 2014/0165530 A1* | 6/2014 | Stutz | F01D 25/18 |
| | | | 60/39.08 |
| 2019/0218936 A1* | 7/2019 | Fomison | F16C 33/6659 |
| 2021/0324798 A1* | 10/2021 | Fujii | F16N 7/32 |
| 2022/0154599 A1* | 5/2022 | Haga | F16N 7/38 |
| 2022/0316396 A1* | 10/2022 | Okuwa | F02C 9/18 |

* cited by examiner

OIL SUPPLY DEVICE OF AIRCRAFT GAS TURBINE

CROSS REFERENCE TO RELATED APPLICATIONS

This application is a National Stage of International Application No. PCT/JP2019/034522 filed Sep. 3, 2019, claiming priority based on Japanese Patent Application No. 2018-166107 filed Sep. 5, 2018, the entire contents of which are incorporated herein by reference.

TECHNICAL FIELD

The present invention relates to an oil supply device of an aircraft gas turbine.

BACKGROUND ART

A bearing supporting a rotating shaft of a gas turbine needs to be lubricated by being continuously supplied with oil. A device disclosed in PTL 1 is configured such that a tip end of an oil feed pipe connected to an oil tank and a tip end of an extraction pipe which extracts high-pressure air from a compressor of a gas turbine are inserted into an outside air pipe directed to a bearing. According to this configuration, by a pressure effect of the extracted air, outside air is sucked into the outside air pipe, and oil is sucked into the outside air pipe. Thus, oil mist is supplied to the bearing.

CITATION LIST

Patent Literature

PTL 1: Japanese Laid-Open Patent Application Publication No. 2013-83159

SUMMARY OF INVENTION

Technical Problem

However, according to the configuration of PTL 1, when a gas turbine is used as an aircraft engine, a rotational frequency of the gas turbine largely changes depending on a flight state, and therefore, the pressure of the extracted air largely changes. When the pressure of the extracted air changes, the amount of oil sucked by the pressure of the extracted air increases or decreases. Therefore, in consideration that the amount of oil supplied increases, a large amount of oil needs to be mounted in an aircraft, and this causes an unnecessary increase in weight of the aircraft. The same is true for lubricated members other than the bearing.

An object of the present invention is to prevent an unnecessary increase in weight of an oil supply device of a gas turbine, the oil supply device being configured to supply oil mist to a lubricated member by using extracted air.

Solution to Problem

An oil supply device of an aircraft gas turbine according to one aspect of the present invention is an oil supply device configured to supply oil to a lubricated member of an aircraft gas turbine. The oil supply device includes: a lubrication extraction pipe including a first end and a second end, the first end communicating with a compressor of the gas turbine, an ejection port being provided at the second end and directed to the lubricated member; an oil tank configured to store the oil; an oil pipe including a first end and a second end, the first end communicating with the oil tank, the second end communicating with the lubrication extraction pipe; and an electric pump interposed on a portion of the oil pipe and configured to suck the oil from the oil tank and supply the oil to an inside of the lubrication extraction pipe.

According to the above configuration, the oil is supplied by the electric pump from the oil tank to the high-pressure air (extracted air) flowing through the lubrication extraction pipe communicating with the compressor, and the generated oil mist is supplied to the lubricated member. At this time, the amount of oil mixed with the extracted air is determined by the operation of the electric pump regardless of a flight state. Therefore, an unnecessarily large amount of oil does not have to be stored in the oil tank. On this account, an unnecessary increase in weight of the aircraft can be prevented. Moreover, even when starting up the gas turbine in a state where the inside of the oil pipe is empty, the electric pump can be driven to fill the oil pipe with the oil without waiting for the operation of the gas turbine. Therefore, lubrication can be started at an early stage when starting up the gas turbine.

The oil supply device may further include a pressurizing mechanism. The oil tank may include a movable body defining an oil chamber configured to store the oil, the movable body being displaceable so as to change volume of the oil chamber. The pressurizing mechanism may push the movable body in such a direction that the volume of the oil chamber decreases.

According to the above configuration, since the oil flowing from the oil tank to the electric pump is pressurized by the pressurizing mechanism, the reliability of the suction of the electric pump improves, and the electric pump can stably discharge the high-pressure oil. To be specific, the electric pump easily discharges the high-pressure oil by the assist of the pressurizing mechanism. Therefore, even when the performance of the electric pump is not high, the oil can be made to join the high-pressure air flowing through the lubrication extraction pipe. Thus, the electric pump can be reduced in size.

The oil tank may further include an air chamber which is separated from the oil chamber by the movable body. The pressurizing mechanism may include a tank extraction pipe including a first end and a second end, the first end communicating with the compressor, the second end communicating with the air chamber. The pressurizing mechanism may apply pressure of extracted air to the movable body from the air chamber side.

According to the above configuration, pressure (pressure of the extracted air) which pushes the movable body of the oil tank and pressure (pressure of the extracted air) in the lubrication extraction pipe with which a discharge port of the electric pump communicates are substantially equal to each other. Therefore, pressure at a suction side of the electric pump and pressure at a discharge side of the electric pump are substantially equal to each other. On this account, even when the pressure in the lubrication extraction pipe is high, the electric pump can discharge the oil at low pressure. Then, since the operation of the electric pump is not influenced by a change in the pressure of the extracted air, the electric pump can stably discharge the oil regardless of the flight state. Therefore, the electric pump can be suitably reduced in size. Moreover, since the oil chamber and the air chamber are separated from each other by the movable body, foreign matters in the extracted air can be prevented from being mixed with the oil. Furthermore, the heat of the high-temperature air (extracted air) supplied to the air chamber of the oil tank is transferred through the movable body to the oil in the oil chamber. Therefore, even when an ambient temperature is low, such as during the flight in the upper sky, the viscosity of the oil can be made low without using a heater, and therefore, the electric pump can smoothly discharge the oil. On this account, since the heater is not included, an increase in weight of the aircraft can be suppressed, and the electric power consumption of the heater can be reduced. Moreover, the oil in the oil chamber of the oil tank is pressurized. Therefore, even when the attitude of the aircraft changes (for example, when the aircraft turns or is inverted), the oil supply device can stably operate.

The oil supply device may further include a heat exchange mechanism configured to cool the lubrication extraction pipe. The heat exchange mechanism may include: an outside air pipe through which outside air flows; a heat exchanger configured to perform heat exchange between the outside air pipe and the lubrication extraction pipe; and an outside air suction extraction pipe including a first end and a second end, the first end communicating with the compressor, the second end communicating with the outside air pipe at a downstream side of the heat exchanger.

According to the above configuration, since the outside air suction extraction pipe communicates with the outside air pipe at a downstream side of the heat exchanger, the outside air can be sucked into the outside air pipe by a pressure effect of the extracted air, and therefore, the high-temperature extracted air flowing through the lubrication extraction pipe can be cooled by the low-temperature outside air in the heat exchanger. Then, since the outside air flows through the outside air pipe but does not flow through the lubrication extraction pipe, the extracted air does not flow to the outside air side by a sudden pressure change, and therefore, the lubrication and the cooling can be stably performed regardless of the flight state.

The electric pump may be a metering pump.

According to the above configuration, the electric pump can continue to discharge a constant amount of oil regardless of a flight speed, an altitude, a gas turbine output, and the like. Therefore, the amount of oil supplied to the lubricated member can be suppressed to the minimum necessary in accordance with the operating state of the gas turbine.

The lubricated member may include a bearing rotatably supporting a rotating shaft of the aircraft gas turbine. A connection portion of the oil pipe connected to the lubrication extraction pipe may be arranged at a downstream side of the compressor in an axial direction of the rotating shaft and a radially outer side of a turbine of the gas turbine.

According to the above configuration, since the connection portion of the oil pipe connected to the lubrication extraction pipe is located close to the bearing, a mixing zone through which the oil mist generated by mixing the oil with the extracted air in the lubrication extraction pipe flows becomes short. Therefore, a time required until the oil is supplied to the bearing when starting up the gas turbine is shortened. Moreover, by a heat radiation effect of the lubrication extraction pipe to an outside, the temperature of the extracted air flowing through the extraction pipe decreases as the extracted air flows to a downstream side of the extraction pipe. Since the oil is mixed with the extracted air at a downstream position of the extraction pipe, the volatilization of the oil is reduced. Therefore, an unnecessarily large amount of oil does not have to be stored in the oil tank, and this can prevent an unnecessary increase in weight of the aircraft. Furthermore, since the oil pipe joins the lubrication extraction pipe at a position immediately close to the bearing, the oil is surely ejected from the ejection port of the lubrication extraction pipe, and the oil can be prevented from stopping flowing in the middle of the pipe.

The electric pump may be arranged at an upstream side of a combustor of the gas turbine.

According to the above configuration, when the outer shape of the gas turbine is set such that a portion where the combustor is arranged is larger in diameter than a portion where the compressor is arranged, the electric pump is compactly accommodated, and therefore, an increase in diameter of an entire apparatus can be suppressed.

Advantageous Effects of Invention

According to the present invention, in an oil supply device of a gas turbine which supplies oil mist to a lubricated member by using extracted air, an unnecessary increase in weight can be prevented, and lubrication can be started at an early stage when starting up the gas turbine.

DESCRIPTION OF EMBODIMENTS

Embodiments will be described with reference to the drawings.

Embodiment 1

Figure 1:
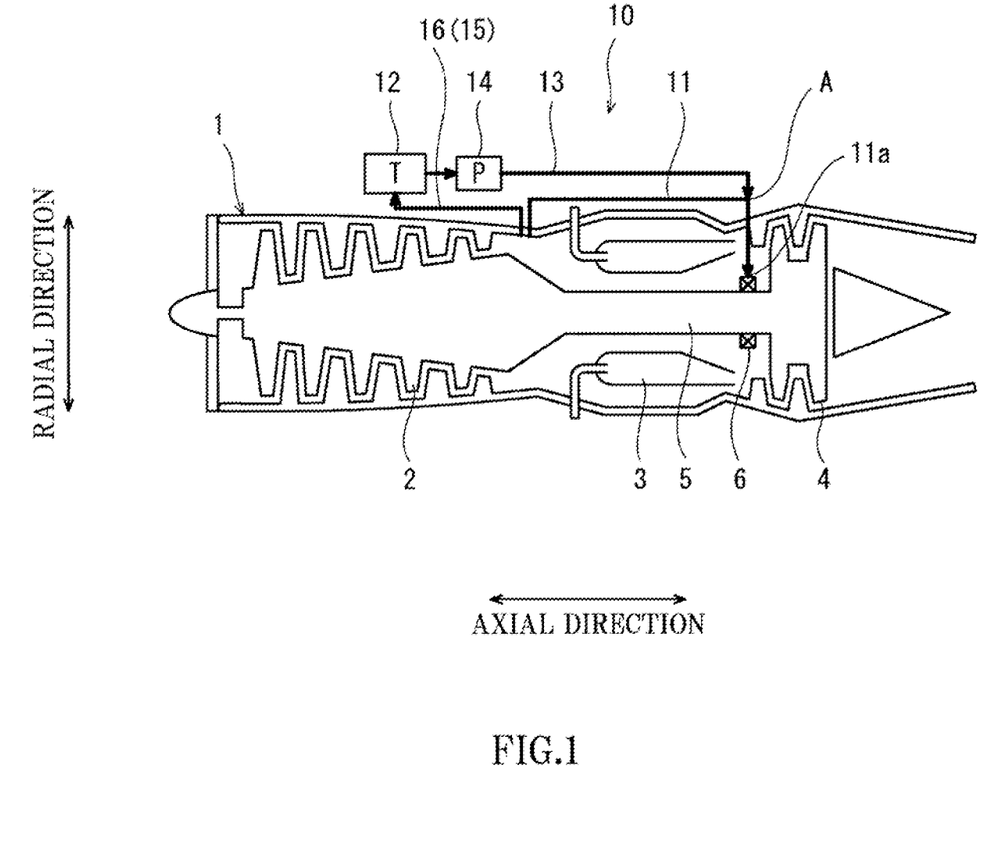
FIG. 1 is a schematic diagram showing an aircraft gas turbine and an oil supply device according to Embodiment 1.

FIG. 1 is a schematic diagram showing an aircraft the gas turbine 1 and an oil supply device 10 according to Embodiment 1. As shown in FIG. 1, according to the gas turbine 1, air introduced from an outside is compressed in a compressor 2 and is then introduced to a combustor 3. Then, energy of a high-temperature high-pressure combustion gas obtained by combusting fuel and compressed air in the combustor 3 is taken out as rotational power in a turbine 4. The turbine 4 and the compressor 2 are coupled to each other by a rotating shaft 5, and the turbine 4 drives the compressor 2. Although there are various types of gas turbines, the type of the gas turbine 1 is not especially limited. The compressor 2 may be an axial compressor, a centrifugal compressor, or both of them. The number of stages of the turbine 4 is arbitrary.

The gas turbine 1 includes lubricated members which need to be lubricated during operation. In the present embodiment, a bearing 6 supporting the rotating shaft 5 at a downstream side of the combustor 3 will be described as the lubricated member. However, the other member may be the lubricated member. The oil supply device 10 mixes oil with extracted air that is air extracted from high-pressure air compressed by the compressor 2 and sprays the mixture as oil mist to the bearing 6. The oil supply device 10 includes a lubrication extraction pipe 11, an oil tank 12, an oil pipe 13, an electric pump 14, and a pressurizing mechanism 15.

A first end of the lubrication extraction pipe 11 communicates with the compressor 2, and a nozzle-shaped ejection port 11a is provided at a second end of the lubrication extraction pipe 11. To be specific, the lubrication extraction pipe 11 is a pipe through which high-pressure air which has been compressed by the compressor 2 and will be supplied to the combustor 3 is taken out to an outside of the gas turbine 1. The ejection port 11a of the lubrication extraction pipe 11 is directed to the bearing 6, and the oil mist ejected from the ejection port 11a lubricates the bearing 6.

The oil tank 12 stores the oil. A specific configuration of the oil tank 12 will be described later with reference to FIG. 2. A first end of the oil pipe 13 communicates with the oil tank 12, and a second end of the oil pipe 13 communicates with a portion of the lubrication extraction pipe 11. The electric pump 14 is interposed on a portion of the oil pipe 13.

The electric pump 14 sucks the oil from the oil tank 12 and supplies the oil to an inside of the lubrication extraction pipe 11. In the present embodiment, a metering pump is used as the electric pump 14. For example, a plunger pump that is one type of reciprocating pump is used. With this, the electric pump 14 can continue to discharge a constant amount of oil regardless of a flight speed, an altitude, a gas turbine output, and the like, and therefore, the amount of oil supplied to the bearing 6 is suppressed to the minimum necessary in accordance with the operating state of the gas turbine 1.

The pressurizing mechanism 15 includes a tank extraction pipe 16. A first end of the tank extraction pipe 16 communicates with an axially downstream portion of the compressor 2, and a second end of the tank extraction pipe 16 communicates with the oil tank 12. It should be noted that the first end of the tank extraction pipe 16 may be connected to the axially downstream portion of the compressor 2 or may be connected to a portion of the lubrication extraction pipe 11 which portion is located upstream of a joining portion where the lubrication extraction pipe 11 and the oil pipe 13 join. A specific structure of the pressurizing mechanism 15 will be described later with reference to FIG. 2.

The oil is supplied by the electric pump 14 from the oil tank 12 through the oil pipe 13 to high-pressure air (extracted air) flowing through the lubrication extraction pipe 11 communicating with the compressor 2, and the generated oil mist is ejected to the bearing 6. At this time, the amount of oil mixed with the extracted air is determined based on the operation of the electric pump 14 regardless of a flight state. Therefore, an unnecessarily large amount of oil does not have to be stored in the oil tank 12. On this account, an unnecessary increase in weight of the aircraft can be prevented. Moreover, even when starting up the gas turbine 1 in a state where the inside of the oil pipe 13 is empty, the electric pump 14 can be driven to fill the oil pipe 13 with the oil without waiting for the operation of the gas turbine 1. Therefore, lubrication can be started at an early stage when starting up the gas turbine 1.

Unlike a mechanical pump, the electric pump 14 is not restricted by, for example, a gear and is high in the degree of freedom of arrangement. Therefore, the arrangement of the electric pump 14 can be determined in accordance with a design requirement. In the present embodiment, the oil tank 12 and the electric pump 14 are arranged at an axially upstream side of the combustor 3 and a radially outer side of the compressor 2. With this, when the outer shape of the gas turbine 1 is set such that a portion where the combustor 3 is arranged is larger in diameter than a portion where the compressor 2 is arranged, the oil tank 12 and the electric pump 14 are compactly accommodated, and therefore, an increase in diameter of an entire apparatus can be suppressed.

A connection portion A of the oil pipe 13 connected to the lubrication extraction pipe 11 is arranged at an axially downstream side of the compressor 2, more specifically, an axially downstream side of the combustor 3 and a radially outer side of the turbine 4. In the present embodiment, the bearing 6 that is the lubricated member is located at an axially downstream side of the combustor 3 and an axially upstream side of the turbine 4. Therefore, the connection portion A of the oil pipe 13 connected to the lubrication extraction pipe 11 is also located at an axially downstream side of the combustor 3 and an axially upstream side of the turbine 4. With this, an axial position of the connection portion A (joining portion) of the oil pipe 13 connected to the lubrication extraction pipe 11 is arranged in the vicinity of an axial position of the bearing 6 that is a lubricated target.

With this, since the connection portion A of the oil pipe 13 connected to the lubrication extraction pipe 11 is located close to the bearing 6, a mixing zone through which the oil mist generated by mixing the oil with the extracted air in the lubrication extraction pipe 11 flows becomes short. Therefore, a time required until the oil is supplied to the bearing 6 when starting up the gas turbine 1 is shortened. Moreover, by a heat radiation effect of the lubrication extraction pipe 11 to an outside, the temperature of the extracted air flowing through the lubrication extraction pipe 11 decreases as the extracted air flows to a downstream side of the lubrication extraction pipe 11. Since the oil is mixed with the extracted air at a downstream position of the lubrication extraction pipe 11, the volatilization of the oil is reduced. Therefore, an unnecessarily large amount of oil does not have to be stored in the oil tank 12, and this can prevent an unnecessary increase in weight of the aircraft. Furthermore, since the oil pipe 13 joins the lubrication extraction pipe 11 at a position immediately close to the bearing 6, the oil is surely ejected from the ejection port 11a of the lubrication extraction pipe 11, and the oil is prevented from stopping flowing in the middle of the pipe. It should be noted that an oil supply target is not limited to the bearing 6, and for example, the oil mist may be ejected to a bearing located at an upstream side (gas turbine inlet port side) of the compressor 2.

Moreover, the electric pump 14 is arranged at an upstream side (gas turbine inlet port side) of the combustor 3. Therefore, as compared to when the electric pump 14 is arranged at a downstream side of the combustor 3, cooling requirements of electrical devices and resin parts for the electric pump 14 can be relaxed, and an increase in cost for cooling or thermal insulation and an increase in the number of parts can be prevented. Furthermore, when the oil tank 12 and/or the electric pump 14 are arranged at a radially inner side of a largest outer diameter portion of an outer shell of the gas turbine 1, the entire gas turbine can be compactly designed.

Figure 2:
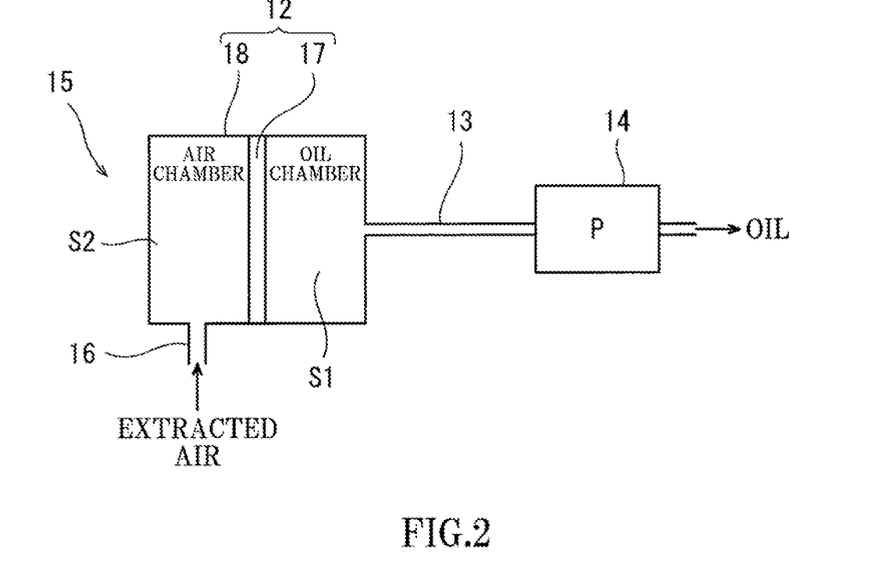
FIG. 2 is a schematic diagram of an oil tank shown in FIG. 1.

FIG. 2 is a schematic diagram of the oil tank 12 shown in FIG. 1. As shown in FIG. 2, the oil tank 12 includes a movable body 17 and a casing 18. The movable body 17 defines an oil chamber S1 which stores the oil. The movable body 17 is displaceable so as to change the volume of the oil chamber S1. The casing 18 defines an air chamber S2 which is separated from the oil chamber S1 by the movable body 17. The movable body 17 is, for example, a piston. The movable body 17 has thermal conductivity. The oil chamber S1 communicates with the oil pipe 13. The air chamber S2 communicates with the tank extraction pipe 16. To be specific, the tank extraction pipe 16, the movable body 17, and the casing 18 constitute the pressurizing mechanism 15.

According to this configuration, the high-pressure extracted air supplied from the gas turbine 1 through the tank extraction pipe 16 to the air chamber S2 pushes the movable body 17 so as to reduce the volume of the oil chamber S1, and thus, the oil is supplied by pressure from the oil chamber S1 to the oil pipe 13. Since the oil flowing from the oil tank 12 to the electric pump 14 is pressurized by the pressurizing mechanism 15, the reliability of the suction of the electric pump 14 improves, and the high-pressure oil is stably discharged. To be specific, the electric pump 14 easily discharges the high-pressure oil by the assist of the pressurizing mechanism 15. Therefore, even when the performance of the electric pump 14 is not high, the oil can be made to join the high-pressure air, flowing through the lubrication extraction pipe 11 (see FIG. 1), from the oil pipe 13 to the lubrication extraction pipe 11. Thus, the electric pump 14 can be reduced in size.

Moreover, as shown in FIGS. 1 and 2, pressure (pressure of the extracted air from the tank extraction pipe 16) which pushes the movable body 17 of the oil tank 12 and pressure (pressure of the extracted air from the lubrication extraction pipe 11) in the lubrication extraction pipe 11 with which a discharge port of the electric pump 14 communicates are substantially equal to each other. Therefore, pressure at a suction side of the electric pump 14 and pressure at a discharge side of the electric pump 14 are substantially equal to each other. On this account, even when the pressure in the lubrication extraction pipe 11 is high, the electric pump 14 can discharge the oil at low pressure. In addition, since the electric pump 14 is not required to strongly suck the oil from the oil tank 12, the generation of cavitation can be prevented. Then, since the operation of the electric pump 14 is not influenced by a change in the pressure of the extracted air, the electric pump 14 can stably discharge the oil regardless of the flight state. Therefore, the electric pump 14 can be suitably reduced in size.

Moreover, the oil in the oil chamber S1 of the oil tank 12 is pressurized by the extracted air toward the electric pump 14. Therefore, even when the attitude of the aircraft on which the gas turbine 1 is mounted changes (for example, when the aircraft turns or is inverted), the oil supply device 10 can stably operate.

Moreover, since the oil chamber S1 and the air chamber S2 are separated from each other by the movable body 17, foreign matters in the extracted air can be prevented from being mixed with the oil. Furthermore, the heat of the high-temperature air (extracted air) supplied to the air chamber S2 of the oil tank 12 is transferred through the movable body 17 to the oil in the oil chamber. Therefore, even when an ambient temperature is low, such as during the flight in the upper sky, the viscosity of the oil can be made low without using a heater, and therefore, the electric pump 14 can smoothly discharge the oil. On this account, since the heater is not included, an increase in weight of the aircraft can be suppressed, and the electric power consumption of the heater can be reduced. It should be noted that it is preferable that the heat conductivity of the movable body 17 be higher than the heat conductivity of the casing 18 which defines the air chamber S2.

Figure 3:
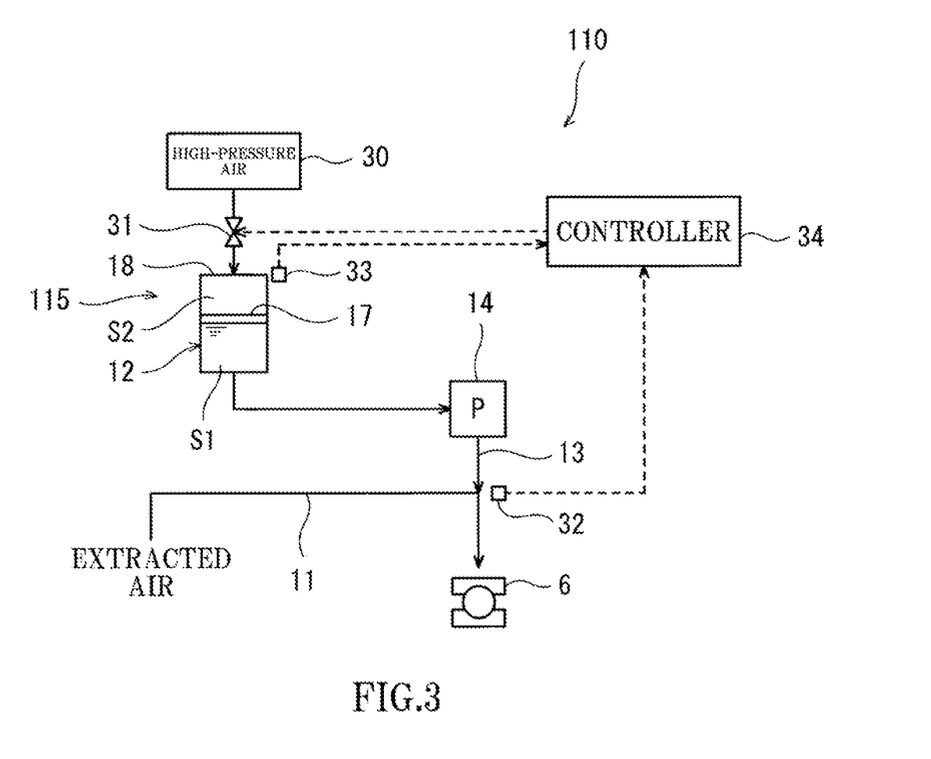
FIG. 3 is a schematic diagram of the oil supply device according to Modified Example 1.

Hereinafter, modified examples indicating variations of the pressurizing mechanism will be described. FIG. 3 is a schematic diagram of an oil supply device 110 according to Modified Example 1. The same reference signs are used for the same components as in Embodiment 1, and explanations thereof are omitted. As shown in FIG. 3, in the oil supply device 110, a pressurizing mechanism 115 is controlled by a controller 34. A high-pressure air tank 30 is connected to the air chamber S2 of the oil tank 12 through an on-off valve 31. To be specific, the movable body 17, the casing 18, the high-pressure air tank 30, and the on-off valve 31 constitute the pressurizing mechanism 115. The high-pressure air tank 30 may be configured to be supplied with high-pressure air by the extracted air supplied from the tank extraction pipe 16 (see FIG. 1) or may be configured to be supplied with high-pressure air from another high-pressure air source.

A pressure sensor 32 configured to detect the pressure of the extracted air in the lubrication extraction pipe 11 is provided at the lubrication extraction pipe 11. The pressure sensor 32 is arranged, for example, in the vicinity of the connection portion A of the oil pipe 13 connected to the lubrication extraction pipe 11. A pressure sensor 33 configured to detect the pressure in the air chamber S2 is provided at the oil tank 12. The controller 34 controls pressurizing force of the pressurizing mechanism 115 in accordance with the extracted air pressure detected by the pressure sensors 32 and 33. To be specific, when the pressure of the extracted air in the lubrication extraction pipe 11 becomes higher than the pressure in the air chamber S2, the controller 34 opens the on-off valve 31 to supply the high-pressure air from the high-pressure air tank 30 to the air chamber S2, and thus, make the high-pressure air push the movable body 17. When the pressure in the air chamber S2 balances with the pressure of the extracted air, the controller 34 closes the on-off valve 31.

According to this configuration, since the oil is supplied by pressure by the pressurizing mechanism 115 from the oil chamber S1 to the oil pipe 13, the reliability of the suction of the electric pump 14 improves, and the oil can be made to smoothly join the lubrication extraction pipe 11 from the oil pipe 13 even when the performance of the electric pump 14 is not high. It should be noted that since the other components are the same as those of Embodiment 1, explanations thereof are omitted.

Figure 4:
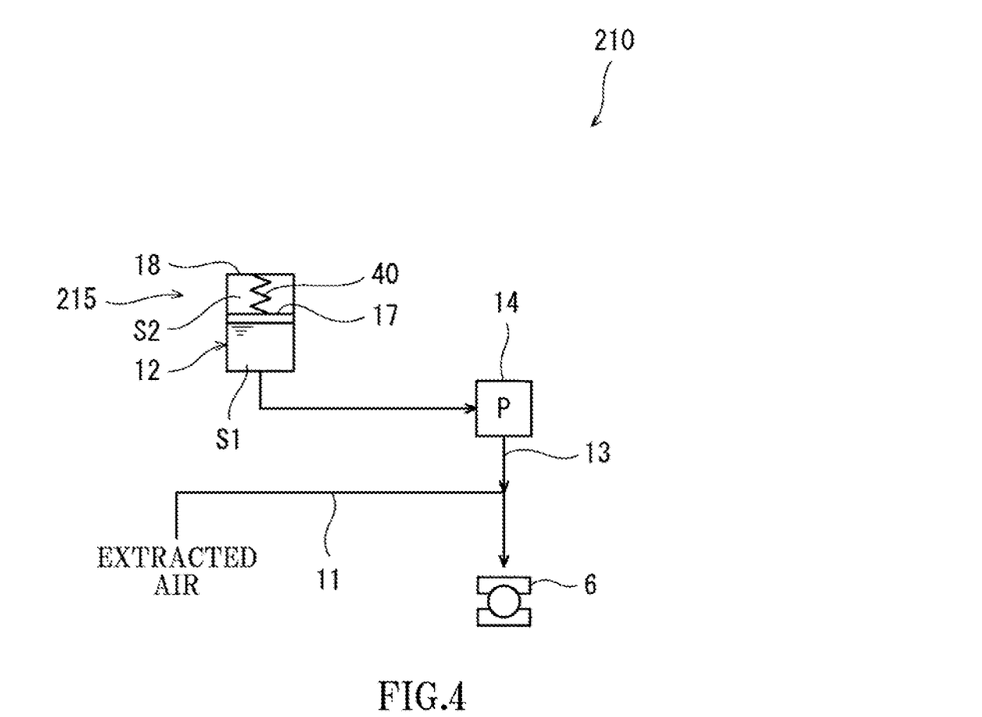
FIG. 4 is a schematic diagram of the oil supply device according to Modified Example 2.

FIG. 4 is a schematic diagram of an oil supply device 210 according to Modified Example 2. It should be noted that the same reference signs are used for the same components as in Embodiment 1, and explanations thereof are omitted. As shown in FIG. 4, in the oil supply device 210, an oil tank 212 includes the casing 18, the movable body 17 (piston), and a spring 40. The movable body 17 divides an inside of the casing 18 into the oil chamber S1 and the air chamber S2 and is displaceable so as to change the volume of the oil chamber S1. The spring 40 biases the movable body 17 in such a direction that the volume of the oil chamber S1 decreases. To be specific, the movable body 17, the casing 18, and the spring 40 constitute a pressurizing mechanism 215.

According to this configuration, since the oil is supplied by pressure by the pressurizing mechanism 215 from the oil chamber S1 to the oil pipe 13, the reliability of the suction of the electric pump 14 improves, and the oil can be made to smoothly join the lubrication extraction pipe 11 from the oil pipe 13 even when the performance of the electric pump 14 is not high. It should be noted that since the other components are the same as those of Embodiment 1, explanations thereof are omitted.

Figure 5:
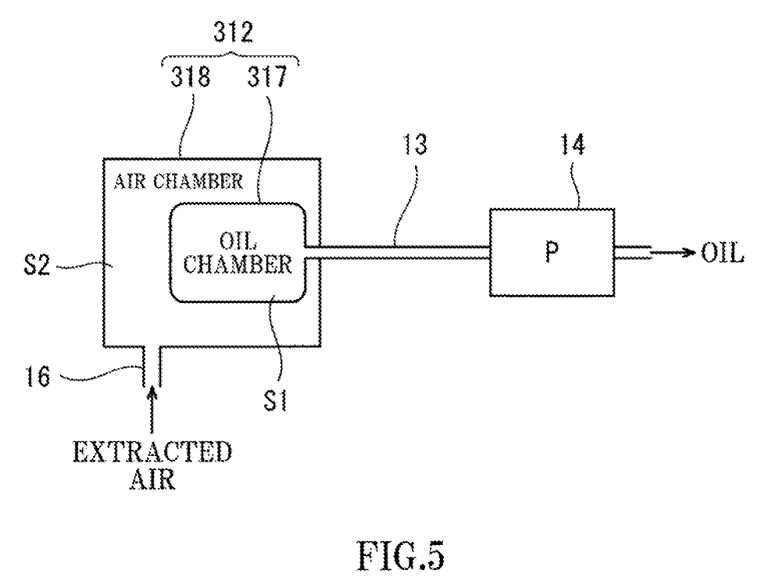
FIG. 5 is a schematic diagram of the oil tank according to Modified Example 3.

FIG. 5 is a schematic diagram of an oil tank 115 according to Modified Example 3. It should be noted that the same reference signs are used for the same components as in Embodiment 1, and explanations thereof are omitted. As shown in FIG. 5, an oil tank 312 includes a movable body 317 and a casing 318. The movable body 317 defines the oil chamber S1 which stores the oil. The movable body 317 is displaceable so as to change the volume of the oil chamber S1. The casing 318 defines the air chamber S2 which is separated from the oil chamber S1 by the movable body 17. The movable body 317 is constituted by, for example, a soft bag-shaped member.

According to this configuration, since the high-pressure extracted air supplied through the tank extraction pipe 16 to the air chamber S2 pushes the movable body 317, and the oil is supplied by pressure from the oil chamber S1 to the oil pipe 13, the reliability of the suction of the electric pump 14 improves, and the oil can be made to smoothly join the lubrication extraction pipe 11 from the oil pipe 13 even when the performance of the electric pump 14 is not high. It should be noted that since the other components are the same as those of Embodiment 1, explanations thereof are omitted.

Embodiment 2

Figure 6:
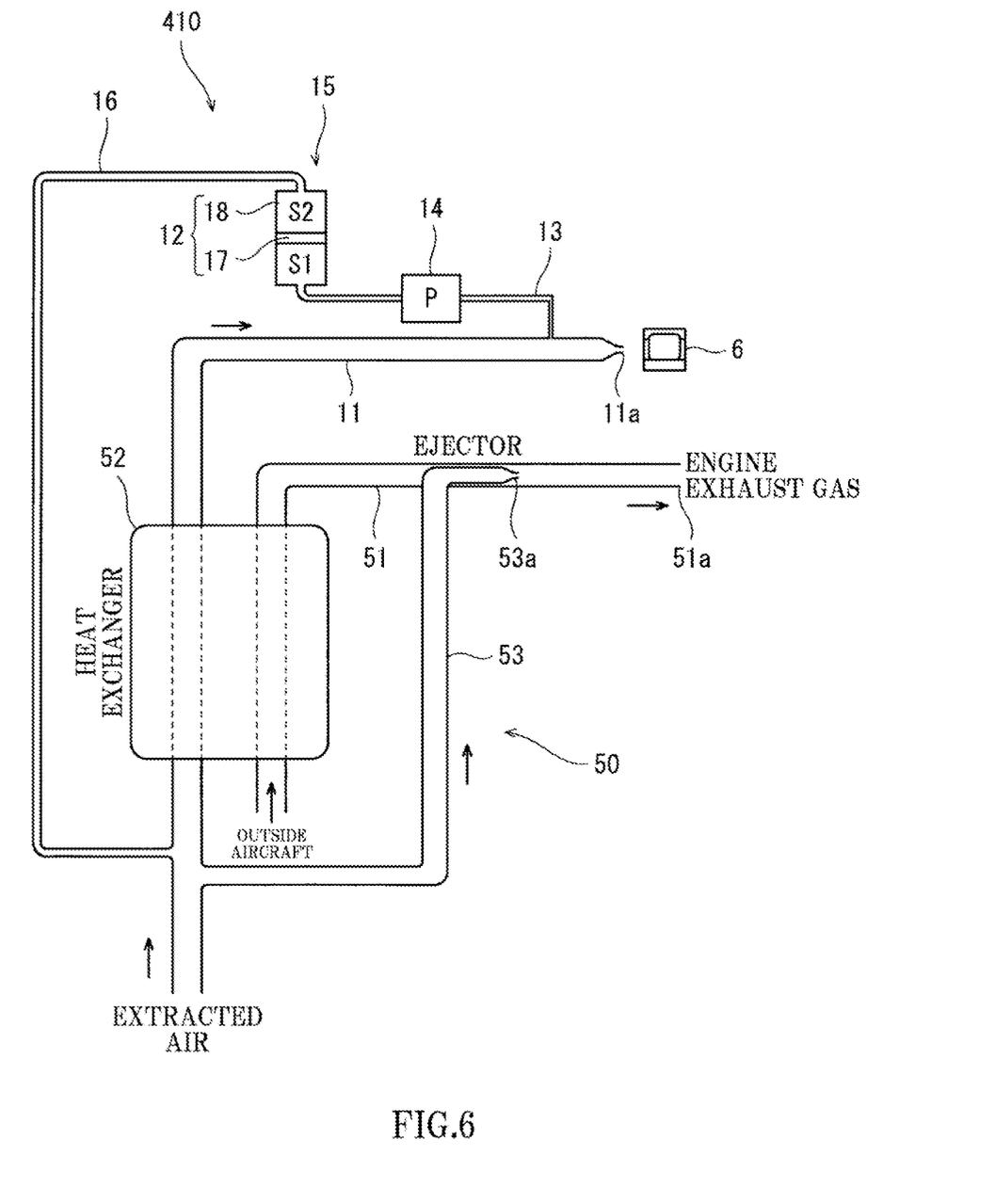
FIG. 6 is a schematic diagram of the oil supply device of the aircraft gas turbine according to Embodiment 2.

FIG. 6 is a schematic diagram of an oil supply device 410 of the aircraft gas turbine according to Embodiment 2. It should be noted that the same reference signs are used of the same components as in Embodiment 1, and explanations thereof are omitted. As shown in FIG. 6, the oil supply device 410 includes a heat exchange mechanism 50 configured to cool the lubrication extraction pipe 11 in order to lower the temperature of the oil mist which lubricates the bearing 6. The heat exchange mechanism 50 includes an outside air pipe 51, a heat exchanger 52, and an outside air suction extraction pipe 53. To be specific, the heat exchange mechanism 50 utilizes the low-temperature outside air to cool the high-temperature extracted air.

Air (outside air) outside the aircraft flows into a first end of the outside air pipe 51, and the air flowing through the outside air pipe 51 flow out from a second end 51a to an exhaust gas of the gas turbine 1. Since the temperature outside the aircraft flying in the upper sky is low, low-temperature air flows through the outside air pipe 51. The heat exchanger 52 performs heat exchange between the outside air pipe 51 and the lubrication extraction pipe 11 to cool the high-temperature lubrication extraction pipe 11 by the low-temperature outside air pipe 51.

A first end of the outside air suction extraction pipe 53 communicates with the compressor 2, and a second end 53a of the outside air suction extraction pipe 53 communicates with the outside air pipe 51 at a downstream side of the heat exchanger 52. The second end 53a of the outside air suction extraction pipe 53 is a nozzle-shaped ejection port. The second end 53a of the outside air suction extraction pipe 53 is arranged inside the outside air pipe 51 and is open toward the second end 51a (outlet) of the outside air pipe 51. With this, by a pressure effect of the extracted air ejected at high speed from the second end 53a of the outside air suction extraction pipe 53, the flow from the first end of the outside air pipe 51 to the second end 51a in the outside air pipe 51 is generated, and the outside air is sucked into the outside air pipe 51 through the first end thereof.

According to this configuration, the outside air can be sucked into the outside air pipe 51 by the pressure effect of the extracted air, and therefore, the high-temperature extracted air flowing through the lubrication extraction pipe 11 can be cooled by the low-temperature outside air in the heat exchanger 52. Then, since the outside air flows through the outside air pipe 51 but does not flow through the lubrication extraction pipe 11, the extracted air does not flow to the outside air side by a sudden pressure change, and therefore, the lubrication and the cooling can be stably performed regardless of the flight state. It should be noted that since the other components are the same as those of Embodiment 1, explanations thereof are omitted.

REFERENCE SIGNS LIST 1 gas turbine
2 compressor
6 bearing (lubricated member)
10, 110, 210, 310 oil supply device
11 lubrication extraction pipe
11a ejection port
12, 312 oil tank
13 oil pipe
14 electric pump
15, 115, 215 pressurizing mechanism
16 tank extraction pipe
17, 117 movable body
50 heat exchange mechanism
51 outside air pipe
52 heat exchanger
53 outside air suction extraction pipe
A connection portion
S1 oil chamber
S2 air chamber

The invention claimed is:

1. An oil supply device configured to supply oil to a lubricated member of a gas turbine,
the oil supply device comprising:
a lubrication extraction pipe including a first end and a second end, the first end communicating with a compressor of the gas turbine, an ejection port being provided at the second end and directed to the lubricated member;
an oil tank configured to store the oil;
an oil pipe including a first end and a second end, the first end communicating with the oil tank, the second end communicating with the lubrication extraction pipe; and
an electric pump interposed on a portion of the oil pipe and configured to suck the oil from the oil tank and supply the oil to an inside of the lubrication extraction pipe.

2. The oil supply device according to claim 1, further comprising a pressurizing mechanism, wherein:
the oil tank includes a movable body defining an oil chamber configured to store the oil, the movable body being displaceable so as to change volume of the oil chamber; and
the pressurizing mechanism pushes the movable body in such a direction that the volume of the oil chamber decreases.

3. The oil supply device according to claim 2, wherein:
the oil tank further includes an air chamber which is separated from the oil chamber by the movable body;
the pressurizing mechanism includes a tank extraction pipe including a first end and a second end, the first end communicating with the compressor, the second end communicating with the air chamber; and
the pressurizing mechanism applies pressure of extracted air to the movable body from the air chamber side.

4. The oil supply device according to claim 1, further comprising a heat exchange mechanism configured to cool the lubrication extraction pipe, wherein
the heat exchange mechanism includes:
an outside air pipe through which outside air flows;

a heat exchanger configured to perform heat exchange between the outside air pipe and the lubrication extraction pipe; and an outside air suction extraction pipe including a first end and a second end, the first end communicating with the compressor, the second end communicating with the outside air pipe at a downstream side of the heat exchanger.

5. The oil supply device according to claim 1, wherein the electric pump is a metering pump.

6. The oil supply device according to claim 1, wherein:

the lubricated member includes a bearing rotatably supporting a rotating shaft of the gas turbine; and a connection portion of the oil pipe connected to the lubrication extraction pipe is arranged at a downstream side of the compressor in an axial direction of the rotating shaft and a radially outer side of a turbine of the gas turbine.

7. The oil supply device according to claim 1, wherein the electric pump is arranged at an upstream side of a combustor of the gas turbine.

\* \* \* \* \*